3,781,245
TITANIUM HYDRIDE CATALYZED POLYESTER POLYCONDENSATION

Yoshio Itabashi, Susumu Saito, and Masao Seki, Hofu, Japan, assignors to Kanebo, Ltd., Tokyo, Japan
No Drawing. Continuation-in-part of abandoned application Ser. No. 868,884, Oct. 23, 1969. This application Mar. 10, 1972, Ser. No. 233,812
Claims priority, application Japan, Oct. 25, 1968, 43/78,122, 43/78,123
Int. Cl. C08g 17/015
U.S. Cl. 260—75 R     3 Claims

ABSTRACT OF THE DISCLOSURE

Polyalkylene terephthalates and polyesters consisting mainly of the polyalkylene terephthalate are produced easily and cheaply by using titanium hydride having a low hydrogenation degree or a mixture of metallic titanium and stoichiometric titanium hydride as a catalyst. The thus obtained polyesters are substantially colorless and have an even color tone between lots.

---

This is a continuation-in-part of our copending application Ser. No. 868,884 filed Oct. 23, 1969, now abandoned.

The present invention relates to a method of producing linear polyesters, particularly polyalkylene terephthalates, and polyesters consisting mainly of polyalkylene terephthalate, by using either a mixture of metallic titanium with stoichiometric titanium hydride or titanium hydride having a low hydrogenation degree.

The catalysts for polycondensation of polyesters have been disclosed in a large number of patents and prior references. For example, Japanese patent application publication No. 8,594/56 has proposed antimony compound soluble in a reaction system, Japanese patent application publication No. 4,146/56, No. 8,595/56, No. 6,392/57 and No. 12,797/61 have proposed cobalt compounds and Japanese patent application publication No. 6,795/61, No. 17,396/62, No. 1,360/66 and No. 1,632/68 have proposed titanium compounds. However, most of these previous catalysts are not always satisfactory in color tone and physical properties of the resulting polyesters.

The titanium previously used as the catalyst for polyesters are mainly organic titanium compounds and generally soluble in the reaction system and they have a high catalytic activity, but color of the resulting polymers is yellow or brown and it is difficult to use them in practice.

The inventors have found that the color tone and physical properties of polyester can be improved by adding metallic titanium or stoichiometric titanium hydride (TiH$_n$, $n$ is about 2) in a form of fine powder, spongy coarse granule or foil to the reaction system and these processes had been disclosed in the copending Japanese patent applications (Japanese patent application No. 6,339/68 and No. 21,703/68).

Metallic titanium has a very high activity as the catalyst for the polycondensation and forms polymers having fairly satisfactory color tone and physical properties, but causes an uneveness in the color tone in the polymers between lots in a commercial production.

On the other hand, commercially available stoichiometric titanium hydride is superior in the color tone of the resulting polymers but inferior in the catalytic activity to metallic titanium and consequently the polycondensation time is longer.

Titanium hydride is an interstitial compound occluding a large amount of hydrogen and is reversible in adsorption and liberation of hydrogen. Hydrogen contained in titanium hydride presumably acts either to suppress a side reaction which causes coloration of polyester in the course of polycondensation reaction or to remove the resulting color. The inventors have found after various experiments that it is possible to obtain a highly improved catalytic activity which has never been attained by metallic titanium or stoichiometric titanium hydride alone, by limiting presence of hydrogen based on metallic titanium to a small ratio and the present invention has been accomplished.

An object of the present invention is to provide colorless polyesters having excellently even color tone and highly improved physical properties.

A further object is to provide a process for producing such excellent polyesters commercially with ease and in a low cost.

The polyesters of the present invention can be produced by subjecting to an esterification or ester interchange reaction terephthalic acid or the dimethyl ester thereof with ethylene glycol and with or without a substance having at least one ester forming functional group and then polycondensing the resulting reaction mixture in the presence of either a mixture of metallic titanium with stoichiometric titanium hydrode or titanium hydride having a low hydrogenation degree as a catalyst.

The term "stoichiometric titanium hydride" used herein means commercialy available titanium hydride having the structural formula of TiH$_2$ and the term "titanium hydride having a low hydrogenation degree" used herein means titanium hydride having a lower hydrogen content than the stoichiometric amount, that is, preferably TiH$_{0.5-1.5}$.

The preferable embodiment of the present invention consists in that, as the catalyst for polycondensation, a mixture of metallic titanium and stoichiometric titanium hydride in a mixture ratio of Ti to TiH$_2$ (by weight) of from 0.3 to 5.0, preferably from 0.5 to 4.0 is used.

The weight ratio beyond this range is not preferable, for the catalytic activity will not be substantially different from that in use of metallic titanium or stoichiometric titanium hydride alone.

The other preferable embodiment of the present invention consists in that, as the catalyst for polycondensation, titanium hydride having a low hydrogenation degree, namely having the general formula TiH$_{n'}$, wherein $n'$ is 0.5 to 1.5 as described above (H$_2$ content is about 1.0 to 3.0% by weight), is used.

The titanium hydride having such a low hydrogenation degree can be produced by crushing mechanically stoichiometric titanium hydride (TiH$_2$, H$_2$ content is about 4% by weight) into colloidal fine powder and then subjecting such a powder to dehydrogenation treatment under a reduced pressure at a temperature of 600 to 700° C. or by reacting spongy titanium with a predetermined amount of hydrogen and then crushing the thus treated titanium. However, in the latter process, if hydrogen is reacted fully to form TiH$_2$, which is pulverized, more fine powders can be obtained and when the obtained powders are subjected to dehydrogenation at 600 to 700° C. to a given hydrogenation degree, the sintering phenomenon observed in the complete dehydrogenation can be avoided, consequently, it is possible to obtain extremely fine powders.

The titanium hydride having the low hydrogenation degree obtained in the above mentioned process has an average grain size of not exceeding 5μ and such titanium hydride can be added to the reaction system directly, but if it is dispersed in a dispersion medium, such as ethylene glycol and then dispersion is pulverized in a ball mill, the catalytic ability can be further improved.

In any case of both the catalysts, the amount of catalyst added is 0.001 to 0.15% by weight, preferably 0.003 to 0.10% by weight, more particularly 0.005 to 0.05% by weight based on the resulting polymer. If the addition amount is larger than this upper limit, the color tone of the polymers tends to become lower, while the amount is less than the lower limit, the longer polycondensation time will be required and such amounts are not preferable. However, an amount beyond this range may be used depending upon the application of the resulting polymers.

When the catalysts insoluble in the reaction system as in the present invention are used, it is desirable in view of promotion of the reaction to make the powder of the catalyst fine as far as possible, e.g. the average grain size thereof being not more than 5μ, whereby contact area of the catalyst is increased or homogeneous dispersion is formed. It has been found that if the polycondensation time is reduced by making the powder more fine, a side reaction causing the coloration is reduced proportionally and the color tone of the resulting polymer can be improved and stabilized.

The present invention consists in a method of producing polyethylene terephthalate or the copolyester consisting mainly of polyethylene terephthalate by polycondensing 100 to 75 mol percent of bis-β-hydroxyethyl terephthalate and 0 to 25 mol percent of at least one of the substances having at least one ester forming functional group selected from the group consisting of aliphatic diols, polyethylene glycols, aromatic diols, alicyclic diols, aliphatic dicarboxylic acids, aromatic dicarboxylic acids and alicyclic dicarboxylic acids in the presence of the above described catalyst.

Said aliphatic diols include, for example, propylene glycol, tetramethylene glycol, pentamethylene glycol, hexamethylene glycol, and the like.

Said polyethylene glycols include, for example, diethylene glycol, triethylene glycol and the like.

Said aromatic diols include, for example, catechol, resorcinol, hydroquinone and the like.

Said alicyclic diols include, for example, cyclohexane dimethanol, cyclohexane diol and the like.

Said aliphatic dicarboxylic acids include, for example, adipic acid, sebacic acid, decandicarboxylic acid and the like.

Said aromatic dicarboxylic acids include, for example, phthalic acid, isophthalic acid, naphthalene dicarboxylic acid and the like.

Said alicyclic dicarboxylic acids include, for example, hexahydroisophthalic acid, hexahydro-terephthalic acid and the like.

The above described esterification reaction, ester interchange reaction and polycondensation may be effected under the previously well known conditions.

The catalyst for the polycondenastion reaction may be present in the esterification reaction or ester interchange reaction.

The presence of delustrant of titanium oxide, pigment, dyestuff, fluorescent whitening agent and the other additives generally used in polyesters does not influence on the method of the present invention.

The following examples are given in illustration of this invention and are not intended as limitations thereof. "Part" in the following examples means by weight.

Polymer viscosity is shown by intrinsic viscosity $[\eta]$ in a mixed solvent of ethane tetrachloride and phenol (mixture ratio 40:60 by weight) at 25° C.

$$[\eta] = \lim_{C \to 0} \frac{\eta^r - 1}{C}$$

$\eta^r$: relative viscosity when polymer concentration is C (g)/100 cc.

The polyesters obtained in the present invention have an intrinsic viscosity of more than 0.60, preferably 0.62 to 0.75.

Number of carboxyl group is determined as follows:
The polymer is titrated by potassium hydroxide in benzyl alcohol.

Number of carboxyl group $$= \frac{\text{equivalent of carboxyl group}}{10^6 \text{ g. polymer}}$$

Melting point is measured by a heated plate apparatus provided with a Lupe (a micro melting point apparatus made by Yanagimoto Co.) and the temperature, when a half amount of the sample is melted, is adopted as melting point of polymer.

EXAMPLE 1

Into a reaction vessel provided with a stirrer, an inlet for gaseous nitrogen and an outlet for gaseous nitrogen and reaction by-products were fed 1,000 parts of dimethyl terephthalate, 700 parts of ethylene glycol, 0.15 part of zinc formate, 0.35 part of triethyl phosphate and various dispersions of metallic titanium powder and stoichiometric titanium hydride in the defined mixture ratio and mixed amount as shown in the following Table 1.

The dispersion of titanium hydride used herein was prepared as follows:

Commercially available stoichiometric titanium hydride ($TiH_2$) was dispersed in ethylene glycol of an amount of four times by weight and the resulting dispersion was pulverized in a ceramic ball mill for five days and then the dispersion was prepared to a concentration of 5% by weight.

The dispersion of powdery metallic titanium was prepared as follows.

Spongy metallic titanium (purity: 99.2%) was coarsely crushed and then pulverized in a ceramic ball mill together with ethylene glycol for 72 hours and then the pulverized titanium was prepared to a concentration of 5% by weight with ethylene glycol and then left to stand for 24 hours and the precipitated coarse particles were filtered off to prepare fine powders having an average grain size of not more than 5μ.

The reaction mixture was heated to 170° C. while introducing nitrogen into the interior of the reaction vessel and after 30 minutes an agitation was started (the agitation speed was 60 r.p.m.) and then an ambient temperature of the reaction vessel was gradually raised and when the temperature reached 210° C. after 6 hours, the ester interchange reaction was finished.

Succeedingly, the ambient temperature was raised to 290° C. in 1 hour while passing nitrogen into the reaction vessel. Then the nitrogen flow was reduced to a very small amount and vapor in the reaction vessel was discharged by a vacuum pump to reach a vacuum degree of 0.3 mm. Hg from atmospheric pressure in 1.5 hours. At this point, a vacuum polymerization reaction was started and further the polycondensation reaction was continued under such a condition and when the viscosity of the reaction product reached a predetermined value, the agitation was stopped and the vacuum pump was stopped to complete the reaction. The reaction product was discharged from the bottom of the reaction vessel by compressing gaseous nitrogen and cooled and then cut into polymer chips.

For the comparison the polycondensation was effected by using each optimum amount of powdery metallic titanium, commercially available stoichiometric titanium hydride and antimony trioxide, respectively alone. Each test was repeated 3 times and an average value of the obtained results is shown in the following Table 1.

As seen from the above Table 2, the catalyst according to the present invention has a high catalytic activity and the resulting polymers have always a stable color tone (substantially colorless) and improved various physical properties.

For the comparison, the polycondensation was effected

TABLE 1

|  | Ti+TiH$_2$ (weight percent/ polymer) | Ti/TiH$_2$ (weight ratio) | Vacuum reaction time (hr.) | Intrinsic viscosity | Number of carboxyl group equivalent/10$^6$ g. | Melting point (° C.) | Color tone of non-crystalline polymer |
|---|---|---|---|---|---|---|---|
| This invention | 0.100 | 0.3 | 2½ | 0.72 | 15.0 | 263.5 | Slight grey (no variation between lots). |
| Do | 0.100 | 1.0 | 1½ | 0.70 | 15.5 | 263.2 | Slight grey or substantially colorless (no variation between lots). |
| Do | 0.050 | 0.5 | 2⅔ | 0.68 | 16.0 | 261.2 | Substantially colorless (no variation between lots). |
| Do | 0.050 | 1.0 | 2 | 0.73 | 16.7 | 263.7 | Do. |
| Do | 0.005 | 0.5 | 2¾ | 0.70 | 15.4 | 263.5 | Do. |
| Do | 0.005 | 1.0 | 2½ | 0.69 | 15.2 | 262.4 | Do. |
| Do | 0.005 | 2.0 | 2⅓ | 0.71 | 16.5 | 263.0 | Do. |
| Do | 0.001 | 1.0 | 3½ | 0.67 | 16.8 | 261.0 | Do. |
| Do | 0.001 | 2.0 | 2⅔ | 0.70 | 15.5 | 262.3 | Do. |
| Do | 0.001 | 3.0 | 2½ | 0.71 | 15.8 | 262.9 | Do. |
| Do | 0.001 | 5.0 | 2⅓ | 0.68 | 16.2 | 261.2 | Do. |
| Do | 0.150 | 0.3 | 2¼ | 0.69 | 16.1 | 261.5 | Light grey (variation between lots). |
| Do | 0.150 | 3.0 | 1¼ | 0.70 | 16.9 | 262.4 | Do. |
| Comparative sample. | 0.005 | 0.1 | 3¼ | 0.68 | 17.0 | 261.3 | Slight grey (variation between lots). |
| Do | 0.005 | 5.5 | 2⅓ | 0.66 | 16.4 | 260.9 | Light grey or slight grey (variation between lots). |

As seen from the above Table 1, when the weight ratio of metallic titanium to stoichiometric titanium hydride is 0.3 to 5.0 and the total amount of these substances added is 0.001 to 0.1% by weight based on polymer, the resulting polymers show always a stable color tone (substantially colorless) and excellent physical properties. The cases wherein metallic titanium or stoichiometric titanium hydride was added respectively in an amount of 0.005% by weight and the mixture ratio and mixed amount of the above two substances are not within the above defined ranges, were checked but the color tone of the resulting polymers varied between lots.

When compared with addition of 0.03% by weight of antimony trioxide of the typical polycondensation catalyst, the catalyst of the present invention is superior in the vacuum reaction time, the color tone of the polymer and various physical properties to antimony trioxide.

EXAMPLE 2

To 900 parts of dimethyl terephthalate, 100 parts of dimethyl isophthalate, 700 parts of ethylene glycol, 0.20 part of zinc acetate (2 hydrate) and 0.28 part of triphenyl phosphite was added a mixture of metallic titanium powder having an average grain size of 5μ and stoichiometric titanium hydride having an average grain size of 5μ in same amount and in the given amount as shown in the following Table 2 and the resulting mixture was subjected to an ester interchange reaction under the same reaction condition as described in Example 1. Succeedingly, the polycondensation reaction was effected to obtain polymer chips. The above described metallic titanium powder and stoichiometric titanium hydride were used as dispersions in ethylene glycol prepared in the same manner as described in Example 1.

For the comparison, metallic titanium powder, stoichiometric titanium hydride and antimony trioxide were added alone respectively and the polycondensation reaction was effected under the same condition as described above and the obtained results are shown in the following Table 2. The numeral values in the Table 2 show each average value of three tests.

by using metallic titanium powder, stoichiometric titanium hydride and antimony trioxide respectively in the same added amount as descrbed above and the color tone of each of the resulting polymers showed slight grey or light yellowish green and the variation of color tone between lots was not avoided.

EXAMPLE 3

Into a reaction vessel provided with a stirrer, an inlet for gaseous nitrogen and an outlet for gaseous nitrogen and by-products were fed 1,000 parts of dimethyl terephthalate, 700 parts of ethylene glycol, 0.15 part of zinc formate, 0.35 part of triethyl phosphate and 0.99 part of a dispersion of titanium hydride having a low hydrogenation degree (TiH$_{1.05}$, corresponding to 0.005% by weight based on polymer as TiH$_{1.05}$).

A dispersion of the titanium hydride to be used herein was prepared as follows:

TiH$_{1.05}$ was dispersed in ethylene glycol of four times by weight and the resulting dispersion was pulverized in a ceramic ball mill for 5 days and then the concentration of dispersion was prepared to 5% by weight.

The resulting mixture was heated while introducing nitrogen into the reaction vessel and 30 minutes after the temperature reached 170° C. the stirrer was driven (agitation speed: 60 r.p.m.) and thereafter the ambient temperature of the reaction vessel was raised gradually and when the temperature reached 210° C. 6 hours after the heating, the ester interchange reaction was finished. The ester interchange reaction percentage calculated from an amount of ethanol distilled off was 98%. Succeedingly, the ambient temperature was raised to 290° C. in 1 hour, while introducing nitrogen into the reaction vessel. Then the gaseous nitrogen flow was reduced to a very small amount and the vapor in the reaction vessel was discharged by a vacuum pump and the pressure was reduced from atmospheric pressure to a vacuum degree of 0.3 mm. Hg in 1.5 hours (this point was the starting point of vacuum polymerization reaction). Furthermore, the polycondensation reaction was continued under such a condition and when the viscosity of the reaction product

TABLE 2

| Ti/TiH$_2$ (weight ratio) | Ti + TiH$_2$ (weight percent/ polymer) | Vacuum reaction time (hr.) | Intrinsic viscosity | Number of carboxyl group equivalent/ 10$^6$ g. | Melting point (° C.) | Color tone of non-crystalline polymer |
|---|---|---|---|---|---|---|
| 1.0 | 0.100 | 1½ | 0.73 | 17.1 | 237.2 | Slight grey (no variation between lots). |
| 1.0 | 0.005 | 2½ | 0.72 | 16.5 | 237.6 | Substantially colorless (no variation between lots.) |
| 1.0 | 0.001 | 3½ | 0.71 | 17.8 | 236.8 | Do. | reached a given value, the agitation was stopped and the vacuum pump was stopped to finish the polycondensation reaction. The reaction product was discharged from the bottom of the reaction vessel by compression of gaseous nitrogen and cooled and then cut to obtain polymer chips.

In the similar process as described above the polycondensation was effected by varying the amount of titanium hydride having a low hydrogenation degree to 0.1% by weight and 0.001% by weight based on polymer respectively.

For the comparison, the polycondensation was effected by adding an optimum amount of metallic titanium powder, stoichiometric titanium hydride (TiH$_2$) and antimony trioxide respectively.

The above described metallic titanium powder was prepared as follows:

Spongy metallic titanium (purity: 99.2%) was coarsely crushed and then pulverized together with ethylene glycol in a ceramic ball mill for 72 hours and prepared into 5% by weight of dispersion in ethylene glycol and then left to stand for 24 hours to precipitate coarse particles and the precipitated coarse particles were filtered off and the remained dispersion was used.

The above described stoichiometric titanium hydride was prepared in the same manner as described in the above preparation of titanium hydride having a low hydrogenation degree. The obtained results are shown in the following Table 3 (the numeral value was an average of three tests repeatedly effected).

EXAMPLE 4

To 900 parts of dimethyl terephthalate, 100 parts of dimethyl isophthalate, 700 parts of ethylene glycol, 0.20 part of zinc acetate (2 hydrate) and 0.28 part of triphenyl phosphite was added 0.005% by weight based on polymer of titanium hydride having low various hydrogenation degrees (0.99 part of 5% by weight of ethylene glycol dispersion) and the resulting mixture was subjected to an ester interchange reaction under the same reaction conditions as described in Example 3, and succeedingly the polycondensation reaction was effected to obtain polymer chips.

For the comparison the polycondensation was effected under the same condition as described above by adding metallic titanium powder, stoichiometric titanium hydride and antimony trioxide prepared in the same manner as described in Example 3. The obtained results are shown in the following Table 4 (the numeral value was an average of three tests carried out repeatedly).

TABLE 4

| | Catalyst | Amount of catalyst (weight percent/ polymer) | Vacuum reaction time (hr.) | Intrinsic viscosity | Number of carboxyl group equivalent/ $10^6$ g. | Melting point (° C.) | Color tone of non-crystalline polymer |
|---|---|---|---|---|---|---|---|
| This invention | TiH$_{0.51}$ | 0.005 | 2¾ | 0.66 | 17.2 | 236.5 | Slight grey (no variation between lots). |
| Do | TiH$_{0.88}$ | 0.005 | 2½ | 0.70 | 16.5 | 237.0 | Substantially colorless (no variation between lots). |
| Do | TiH$_{1.25}$ | 0.005 | 2¼ | 0.73 | 15.8 | 237.8 | Do. |
| Do | TiH$_{1.48}$ | 0.005 | 3⅙ | 0.72 | 16.7 | 237.2 | Do. |
| Comparative sample. | TiH$_{0.40}$ | 0.005 | 2¾ | 0.62 | 17.8 | 265.6 | Slight grey (variation between lots). |
| Do | TiH$_{1.62}$ | 0.005 | 3½ | 0.70 | 17.5 | 237.0 | Do. |

As seen from the above Table 4 the catalysts having the structural formula of TiH$_n$, wherein $n$ is 0.5 to 1.5, show very excellent catalytic activity and the resulting polymers are substantially colorless and there is no unevenness of color tone between lots.

However, when 0.005% by weight of each metallic titanium powder and TiH$_2$ and 0.03% by weight of antimony trioxide was added respectively, the polymers having substantially the same physical properties as those of the polymers as described above were obtained, but the

TABLE 3

| Catalyst | Amount of catalyst (weight percent/ polymer) | Vacuum reaction time (hr.) | Intrinsic viscosity | Number of carboxyl group equivalent/ $10^6$ g. | Melting point (° C.) | Color tone of non-crystalline polymer |
|---|---|---|---|---|---|---|
| TiH$_{1.05}$ | 0.1 | 1½ | 0.73 | 15.9 | 262.5 | Slight grey (no variation between lots). |
| TiH$_{1.05}$ | 0.005 | 2½ | 0.70 | 14.8 | 263.0 | Substantially colorless (no variation between lots). |
| TiH$_{1.05}$ | 0.001 | 3½ | 0.69 | 17.2 | 261.8 | Do. |

As seen from the above Table 3, the catalyst according to the present invention has a high catalytic activity and the resulting polymer shows always a stable color tone (substantially colorless) and excellent various physical properties.

On the other hand, all the polymers obtained in the comparative tests effected by adding 0.005 to 0.03% by weight of titanium powder, 0.005 to 0.05% by weight of stoichiometric titanium hydride and 0.03% by weight of antimony trioxide showed slight grey or light yellow and variation of color tone between lots was observed.

Furthermore, it has been found that the vacuum reaction time according to the catalyst of the present invention, when the added amount was equal, was somewhat longer than that of metallic titanium powder, but was extremely shorter than that of the stoichiometric titanium hydride. Moreover, the vacuum reaction time in addition of 0.03% by weight of antimony trioxide was same as that in addition of 0.001% by weight of catalyst of this invention and it has been confirmed that the catalytic activity of the present invention was excellent.

color tones were slight grey or light yellowish green and distinct unevenness in color tone was observed between lots. Furthermore, it has been found that the vacuum reaction time can be reduced as compared with TiH$_2$ and antimony trioxide.

EXAMPLE 5

Into a reaction vessel used in Example 1 were fed 750 parts of terephthalic acid, 700 parts of ethylene glycol and 0.1 part of a mixture of metallic titanium powder and stoichiometric titanium hydride (0.011 by weight based on the polymer, a mixture ratio of Ti/TiH$_2$ by weight: 2.5).

The reaction vessel was substituted with gaseous nitrogen and the reaction mixture was heated at 230–250° C. under a pressure of 2.5 kg./cm.$^2$ for 2.5 hours while introducing gaseous nitrogen into the interior of the reaction vessel to complete the esterification reaction.

Succeedingly, the polycondensation reaction was effected at 260° C. under a vacuum degree of 0.4 mm. Hg for 5 hours.

The resulting polyester had an intrinsic viscosity of 0.71, a number of carboxyl group of 16.1 and a melting point of 263.2° C. and was substantially colorless.

What is claimed is:

1. A method of producing substantially colorless polyesters having an intrinsic viscosity of more than 0.60 and having an excellent even colour tone and highly improved physical properties which comprises polycondensing 100 to 75 mol percent of bis-$\beta$-hydroxyethyl terephthalate and 0 to 25 mol percent of at least one of aliphatic diols, polyethylene glycols, aromatic diols, alicyclic diols, aliphatic dicarboxylic acids, aromatic dicarboxylic acids and alicyclic dicarboxylic acids in the presence of a catalyst of either a mixture of metallic titanium with titanium hydride ($TiH_2$), said mixture ratio by weight of Ti to $TiH_2$ being from 0.3 to 5.0 or titanium hydride having the formula $TiH_n$, wherein $n$ is 0.5 to 1.5, the catalyst amount being 0.001 to 0.15% by weight based on the resulting polymer.

2. The method as claimed in claim 1, wherein said polyester is polyethylene terephthalate.

3. The method as claimed in claim 1, wherein said metallic titanium and titanium hydride have an average grain size of not exceeding $5\mu$.

References Cited

FOREIGN PATENTS 1,953,706   5/1970   Germany.

MELVIN GOLDSTEIN, Primary Examiner

U.S. Cl. X.R.

260—47 C